United States Patent
Feron et al.

(10) Patent No.: US 10,558,216 B2
(45) Date of Patent: Feb. 11, 2020

(54) METHOD FOR CONTROLLING AN AUTOMATED DRIVER-ASSISTANCE SYSTEM OF A MOTOR VEHICLE

(71) Applicant: PSA AUTOMOBILES S.A., Poissy (FR)

(72) Inventors: Stephane Feron, Le Plessis Robinson (FR); Vincent Laine, Les Clayes Sous Bois (FR); Celine Taccori Duvergey, Montrouge (FR)

(73) Assignee: PSA Automobiles SA, Poissy (FR)

( * ) Notice: Subject to any disclaimer, the term of this patent is extended or adjusted under 35 U.S.C. 154(b) by 28 days.

(21) Appl. No.: 16/068,060

(22) PCT Filed: Dec. 22, 2016

(86) PCT No.: PCT/FR2016/053634
§ 371 (c)(1),
(2) Date: Jul. 3, 2018

(87) PCT Pub. No.: WO2017/118789
PCT Pub. Date: Jul. 13, 2017

(65) Prior Publication Data
US 2019/0339695 A1    Nov. 7, 2019

(30) Foreign Application Priority Data

Jan. 7, 2016 (FR) ...................... 16 50096

(51) Int. Cl.
*G05D 1/00* (2006.01)
*B60W 50/08* (2020.01)

(52) U.S. Cl.
CPC ......... *G05D 1/0061* (2013.01); *B60W 50/082* (2013.01); *B60W 2540/04* (2013.01); *G05D 2201/0213* (2013.01)

(58) Field of Classification Search
None
See application file for complete search history.

(56) References Cited

U.S. PATENT DOCUMENTS

| 10,386,853 B2 * | 8/2019 | Borngraber | |
| 2010/0324797 A1 * | 12/2010 | Fritz | B60W 10/06 701/96 |

(Continued)

FOREIGN PATENT DOCUMENTS

| DE | 10 2006 058412 A1 | 6/2008 |
| DE | 10 2007 062698 A1 | 7/2009 |

(Continued)

OTHER PUBLICATIONS

International Search Report for corresponding PCT/FR2016/053634 dated Apr. 13, 2017.

(Continued)

*Primary Examiner* — Kaveh Abrishamkar
(74) *Attorney, Agent, or Firm* — Sandberg Phoenix & von Gontard, P.C.

(57) ABSTRACT

The invention relates to a method for controlling an automated driver-assistance system of a motor vehicle, which proposes a first automated driving mode disengaging at the end of a first transition phase and a second automated driving mode disengaging at the end of a second shorter transition phase, comprising the following sequence of steps: detecting, when the first mode is activated, a degradation of the driving context which does not allow same to continue beyond said first transition phase (100); assessing the level of attention to driving of the driver (200); checking the compatibility of the driving context with the implementation of said second mode and that said level of attention is no lower than a predefined minimum threshold (300); and directly activating said second mode (600) if said checking (Continued)

step is validated and if said driver performs a given action within a predetermined time period.

10 Claims, 1 Drawing Sheet

(56) References Cited

U.S. PATENT DOCUMENTS

| | | | |
|---|---|---|---|
| 2016/0303972 A1 | 10/2016 | Kuhne | |
| 2017/0293350 A1* | 10/2017 | Hsiao | G06T 19/00 |
| 2017/0364148 A1* | 12/2017 | Kim | B60K 37/06 |
| 2018/0011497 A1* | 1/2018 | Schroeder | B62D 15/025 |
| 2018/0095477 A1* | 4/2018 | Borngraber | G05D 1/0285 |

FOREIGN PATENT DOCUMENTS

| | | | | |
|---|---|---|---|---|
| DE | 10 2013 019141 A1 | | 5/2015 | |
| DE | 102015201555 A1 | * | 8/2016 | B62D 15/025 |
| WO | 2016120083 A1 | | 8/2016 | |

OTHER PUBLICATIONS

Written Opinion for corresponding PCT/FR2016/053634 dated Apr. 13, 2017.

* cited by examiner

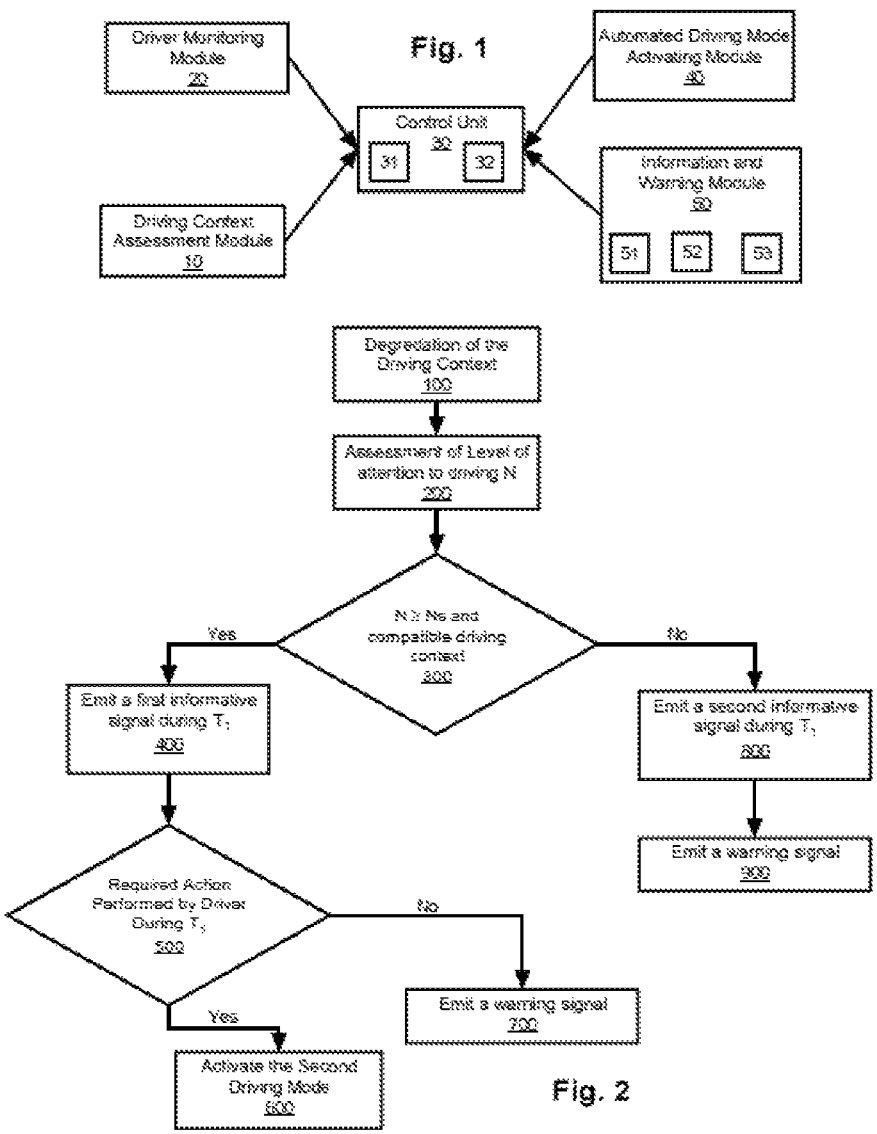

METHOD FOR CONTROLLING AN AUTOMATED DRIVER-ASSISTANCE SYSTEM OF A MOTOR VEHICLE

CROSS-REFERENCE TO RELATED APPLICATIONS

The present application is the US national stage under 35 U.S.C. § 371 of International Application No. PCT/FR2016/053634 having an international filing date of Dec. 22, 2016, which claims the priority of French application 1650096 filed on Jan. 7, 2016.

FIELD OF THE INVENTION

The present invention generally relates to driver-assistance systems provided with several driving modes that are fully automated for a motor vehicle. In particular it relates to the issue of transitioning between these different modes.

BACKGROUND OF THE INVENTION

Driver-assistance systems are widespread in recent motor vehicles and are experiencing rapid development.

Adaptive cruise control (ACC) has been known for some time. Such an assistance mode automatically adjusts the speed in order to keep a constant safety distance from the vehicle in front of the user using information collected on this vehicle (in particular the distance and the approach speed) using one or several radar, lidar or infrared sensors.

Also known, in particular from US Published patent application US 2013/0096767, are dynamic lane departure warning systems. These are generally referred to using the acronyms ALKA (for "Active Lane Keep Assist"), LKAS (for "Lane Keep Assistance System"), ALA (for "Active Lane Assist") or ALC (for "Active Lane Control"), and detect the lines marked out on the ground using sensors and/or optical cameras, and dynamically intervene on the vehicle when it deviates from its traffic lane. In such a scenario, the driver-assistance system will then automatically correct the direction of the vehicle and/or activate braking.

More recently, two completely autonomous driver-assistance modes have appeared in order to help the driver in dense traffic situations on divided highways where the vehicle's speed is reduced.

This is in particular the case for driver-assistance modes in traffic jams (better known under the acronym TJC for "Traffic Jam Chauffeur") intended to relieve the driver in dense traffic or traffic jam situations (speeds below 50/70 km/h) on divided highways (highways and express roads).

In case of a degradation of the environmental driving context which would require a return to the manual driving mode, these TJC-type assistance modes are capable of maintaining fully automated guidance of the vehicle over a fairly long transitional period of around ten seconds before returning to the manual driving mode, such that the driver is not required to keep his eyes fixed on the road and can perform other tasks (placing telephone communications, watching a movie through the vehicle's entertainment system, playing a videogame on a computer or tablet, reading a book or magazine, etc.).

Lastly, driver-assistance modes have recently appeared on highways commonly referred to using the acronyms HAD (for "Highway Automated Driving") or AHDA (for "Automatic Highway Driving Assist"). These driver-assistance modes are also able to relieve the driver on divided highways, but without usage restrictions relative to the speed of the vehicle or the density of the road traffic.

In such an embodiment, the fully automated guiding can only be maintained over a short transitional period (typically comprised between 1 and 3 seconds) in case of degradation of the driving context requiring a return to manual driving. It is therefore essential for the driver to maintain a certain attention level on the road at all times in order to be ready to take back control of the vehicle instantaneously.

Some vehicles are thus now provided with a driver-assistance system offering both of these last two complementary fully automated driving modes.

However, in such a scenario, the terms for implementing these two modes are made completely independent of one another: each may only be activated from a manual driving mode, without the possibility of transitioning between the two directly.

SUMMARY

The method disclosed herein aims to improve the management of the different automated driving modes offered by such a driver-assistance system.

To that end, a method for controlling an automated driver-assistance system of a motor vehicle proposing a first fully automated driving mode with disengagement, in case of non-compatibility of the driving context with the continuation of the first mode, to the manual driving mode at the end of the first transition phase, and a second fully automated driving mode disengaging, in case of non-compatibility of the driving context with the continuation of this second mode, toward the manual driving mode at the end of a second transition phase shorter than the first transition phase; the method being characterized in that it successively includes the following steps:

- detecting, while the first automated driving mode is activated, a degradation of the driving context which no longer allows for the continuation of this mode beyond the first transition phase;
- assessing the attention level to driving of the driver;
- checking the compatibility of the driving context with the implementation of the second automated driving mode and that the driver's attention level is greater than or equal to a predefined threshold; and
- directly activating the second automated driving mode without passing through the manual driving mode, this step only being carried out if the checking step is validated and as long as the driver further performs, within a predetermined amount of time shorter than the first transition phase, an action indicating his desire to enter the second automated driving mode.

The method makes it possible to guarantee, completely safely and as long as the driver has confirmed his desire to do so, a direct transition between the two automated driving modes without unnecessary passage through a manual driving phase, as has been the case to date.

According to preferred features of the method, considered alone or in combination:

- the predetermined duration is between 5 and 7 seconds;
- the action indicating the desire of the driver to go to the second automated driving mode comprises pressing on the accelerator pedal, on the activation button for the second automated driving mode, or on both the upward or downward input speed adjustment buttons of the motor vehicle;
- the method includes, immediately after the validation of the checking step, a step for sending a first informative signal during the predetermined duration indicating, to the driver, the upcoming interruption of the first automated driving mode and proposing to him whether he wishes for the system to directly activate the second automated driving mode;

the method includes, at the end of the predetermined duration when the driver has not performed a set action reflecting his desire to go to the second automated driving mode, a step for sending a warning signal warning the driver of the need to take back control of the vehicle and running until the end of the first transition phase;

the method includes, immediately after the non-validation of the checking step, an emission step during the predetermined duration of a second informative signal simply indicating, to the driver, the upcoming interruption of the first automated driving mode so that he can prepare to take back control of the vehicle;

during the emission of the second informative signal, pressing on the activation button of the second automated driving mode directly causes the second driving mode to be activated as long as the driving context is compatible with its implementation;

the method includes, at the end of the predetermined duration, a step for emitting a warning signal warning the driver of the need to take back control of the vehicle and running until the end of the first transition phase;

the first or second informative signal includes a visual component comprising the continuous display of an appropriate text message on at least one screen of the vehicle; and/or the first or second informative signal further includes a sound component consisting of emitting a single periodic sound signal.

BRIEF DESCRIPTION OF THE DRAWINGS

The description of the invention will now be continued through the detailed description of one example embodiment, provided below as an illustration and non-limitingly, in reference to the appended drawings, in which:

FIG. 1 shows a block diagram of an automated driver-assistance system for a motor vehicle; and FIG. 2 is a flowchart of the method for controlling this automated driver-assistance system.

DETAILED DESCRIPTION OF ONE PREFERRED EMBODIMENT

The automated driver-assistance system shown in FIG. 1 proposes two complementary fully automated driving modes of the vehicle:

a first mode of the TJC type making it possible to completely relieve the driver on divided highways in dense traffic or traffic jam situations (speed below 50/70 km/h), and with disengagement, in case of non-compatibility of the driving context with the continuation of this mode, toward manual driving after a first so-called "long" transition phase, the duration of which is for example greater than or equal to 10 seconds; and a second mode of the HAD type making it possible to completely relieve the driver on divided highways but without usage restriction relative to the speed of the vehicle or the density of the road traffic: the disengagement from this first automated driving mode taking place, in case non-compatibility of the driving context with its continuation, toward the manual driving mode at the end of a second, so-called "short" transition phase, the duration of which is shorter than that of the first transition phase and for example less than or equal to 3 seconds.

In reference to FIG. 1, this automated driver-assistance system includes a module 10 for evaluating the driving context, a driver monitoring module 20, a control unit 30, a module 40 for actuating automated driving modes, and an information and warning module 50.

The module 10 for assessing the driving context includes video acquisition means (for example, a camera of the CCD type oriented toward the front of the vehicle) delivering images making it possible to determine the type of road (highway, express road or side road) from certain characteristic parameters such as the width of the road, the marking on the ground (color, width and spacing of the lines) and the presence of any barrier or a central separating median strip in both traffic directions. The analysis of the images provided by these video acquisition means further makes it possible to establish the level of fluidity of the road traffic.

The module 10 also comprises a plurality of sensors measuring certain internal driving parameters such as the instantaneous speed of the vehicle and the steering angle of the steering wheel.

This module 10 further includes a rain detector provided with a sensor of the optical or capacitive type for example integrated into the upper part of the windshield, as well as a map of the road network providing a certain quantity of information on the upcoming segments to be encountered by the vehicle (type of road, number of lanes, degree of winding, speed limits, etc.).

The driver monitoring module 20 is responsible for assessing the driver's level of attention to driving based on certain parameters such as the frequency of his gaze focused on the road and the activity he is in the process of performing (reading a book, listening to music or watching a movie).

This information is obtained by processing and crossing data received from:

the entertainment system of the vehicle to which the module 20 is connected and which informs the module 20 of the function currently activated on this device or on a roaming electronic device such as a smartphone or tablet connected to the entertainment system (playing a video, telephone conversation, listening to music, etc.); and video acquisition means oriented toward the driver and able to watch his gaze, identify objects used by him but not connected to the entertainment device (laptop, book) as well the position of such objects relative to his face (facing him or against his ear).

The data collected by the modules for evaluating the driving context 10 and monitoring the driver 20 are sent in real-time to the control unit 30, to which these modules are connected.

The control unit 30 includes a computer 31 as well as a storage module 32 containing non-volatile memory of the EEPROM or FLASH type and random-access memory.

This nonvolatile memory in particular stores the method in the form of a program comprising command lines and intended to be implemented by this computer.

The control unit 30 is connected to the actuating module 40, to which it is able to send the order to activate or deactivate one of the driving assistance modes.

This actuating module 40 includes a plurality of actuators able to control certain components of the vehicle, such as the steering, acceleration, braking and gearbox, to see to the implementation of the two fully automated driving modes proposed by the system 1.

The information warning system 50 includes a first information screen 51 preferably integrated into the instrument panel of the vehicle and able to broadcast visual messages to the driver.

The module 50 optionally comprises a second screen 52 integrated into the center console of the dashboard of the vehicle (the latter preferably being made up of the display screen of the entertainment device) and intended to display additional visual messages such as the indication of the automated driving mode that may potentially be activated.

This module 50 is also provided with a siren 53 able to emit an acoustic warning signal when the driver must take back control of the steering wheel.

We will now provide a detailed description, using the flowchart of FIG. 2, of the different steps of the process according to the invention.

This process is initiated when the module 10 detects, while the first automated driving mode of the TJC type is activated, a degradation of the driving context no longer making it possible to continue this mode beyond the first so-called "long" transition phase (initial step 100). This is in particular the case when the traffic once again becomes fluid or the vehicle leaves a divided highway.

The process then automatically assesses, via the module 20, the attention level N of the driver to driving (step 200).

The process will next check whether the situation at hand simultaneously meets both of the conditions prior to implementing the second automated driving mode of the HAD type (step 300).

The first condition pertains to the estimated attention level N of the driver, which must be greater than or equal to a predefined minimum threshold $N_S$.

The second condition is relative to the driving context, which must be compatible with the implementation of this second automated driving mode. This will be the case in the matter at hand if the vehicle remains on a divided highway.

If these two conditions are met (i.e., if checking step 300 is validated), the control unit 30 will instruct the information and warning module 50 to emit, immediately and for a predetermined duration $t_1$ shorter than that of the first transition phase (preferably equal to half of the latter and/or between 5 and 7 seconds), a first informative signal informing the driver of the upcoming interruption of the first automated driving mode of the TJC type and asking him whether he wishes for the system to activate the second automated driving mode of the HAD type directly by the driver performing an action reflecting this desire, this action comprising in the case at hand of pressing on the accelerator pedal or on the button to activate this second automated driving mode or on one of the two buttons to adjust the input speed upward or downward (step 400).

This first informative signal includes a visual component comprising the continuous display of an appropriate text message (for example "First automated driving mode ending soon—Direct activation of the second automated driving mode possible") on at least one screen of the vehicle (preferably, on the screen 52 of the entertainment system and/or on the screen 51 of the instrument panel).

It may optionally further include a sound component comprising emitting, via the siren 53, a unique periodic sound signal intended to engage the driver whose gaze is not turned facing the display screens of the vehicle.

During this period $t_1$, the method/system will verify whether the driver performs one of the required actions set out above indicating his desire to switch to the second automated driving mode (step 500).

If yes, the control unit sends the actuating module 40 the order to instantaneously activate the second automated driving mode of the HAD type without going through the manual driving mode (step 600).

If no, at the end of this period $t_1$, the control unit 30 will order the module 50 to emit, until the end of the first transition phase, a warning signal warning the driver of the need to take back control of the vehicle (step 700).

We will now return to the checking step 300.

If at least one of the two conditions is not verified (i.e., if step 300 is not validated), the control unit 30 will then instruct the information and warning module 50 to emit, immediately and during the predetermined duration $t_1$, a second informative signal simply informing the driver of the upcoming interruption of the first automated driving mode of the TJC type so that he will prepare to take back control of the vehicle (step 800).

This second informative signal includes a visual component comprising the continuous display of an appropriate text message (for example, "First automated driving mode ending soon—Prepare to take back control of the vehicle") on at least one screen of the vehicle (preferably, on the screen of the entertainment system 52 and/or on the screen 51 of the instrument panel).

It may optionally further include a sound component comprising the emission, via the siren 53, of a simple periodic sound signal intended to engage the driver whose gaze is not facing one of the display screens of the vehicle.

At the end of this period $t_1$, the control unit 30 will order the module 50 to emit, until the end of the first transition phase, a warning signal warning the driver of the need to take back control of the vehicle (step 900).

In general, it will be recalled that the present invention is not limited to the embodiments described and shown, but that it encompasses any alternative embodiment within the reach of one skilled in the art.

It is for example possible to provide, during the emission of the second informative signal, that pressing on the button to activate the second automated driving mode of the HAD type also directly causes its activation as long as the driving context is compatible with its implementation.

The invention claimed is:

1. A method for controlling an automated driver-assistance system of a motor vehicle having manual driving mode, a first fully automated driving mode which, in case of non-compatibility of the driving context with the continuation of said first mode, disengages to the manual driving mode at the end of the first transition phase, and a second fully automated driving mode, which in case of non-compatibility of the driving context with the continuation of this second mode, disengages to said manual driving mode at the end of a second transition phase shorter than the first transition phase; said method successively comprising the following steps:
   detecting, while said first automated driving mode is activated, a degradation of the driving context no longer allowing the continuation of the first automated driving mode beyond said first transition phase;
   assessing the attention level to driving of the driver;
   checking (1) the compatibility of the driving context with the implementation of said second automated driving mode and (2) that the attention level of the driver is greater than or equal to a predefined threshold; and
   directly activating said second automated driving mode without passing through said manual driving mode, this activating step only being carried out if said checking step is validated and as long as said driver further performs, within a predetermined amount of time ($t_1$) shorter than said first transition phase, an action indicating the driver's desire to enter said second automated driving mode.

2. The method for controlling an automated driver-assistance system according to claim 1, wherein said predetermined duration ($t_1$) is between 5 and 7 seconds.

3. The method for controlling an automated driver-assistance system according to claim 1, wherein said action indicating the desire of said driver to go to said second automated driving mode comprises pressing on the accelerator pedal, on an activation button of said second automated driving mode, or on both an upward or downward input speed adjustment buttons of said motor vehicle.

4. The method for controlling an automated driver-assistance system according to claim 1, wherein the method includes, immediately after validation of said checking step, a step for sending a first informative signal during said predetermined duration indicating, to said driver of the upcoming interruption of said first automated driving mode and prompting the driver to indicate the driver's desire for the driver-assistance system to directly activate said second automated driving mode.

5. The method for controlling an automated driver-assistance system according to claim 4, wherein the method includes, if at the end of said predetermined duration ($t_1$) said driver has not performed a set action reflecting his desire to go to said second automated driving mode, a step of sending a warning signal warning said driver of the need to take back control of the vehicle and running until the end of said first transition phase.

6. The method for controlling an automated driver-assistance system according to claim 1, wherein the method includes, immediately after the non-validation of said checking step, a step of emitting during said predetermined duration a second informative signal simply indicating, to said driver, the upcoming interruption of said first automated driving mode so that the driver can prepare to take back control of the vehicle.

7. The method for controlling an automated driver-assistance system according to claim 6, wherein, during the emission of the second informative signal, pressing on the activation button of said second automated driving mode directly causes the second automated driving mode to be activated as long as the driving context is compatible with its implementation.

8. The method for controlling an automated driver-assistance system according to claim 5, wherein the method includes, at the end of said predetermined duration ($t_1$), a step of emitting a warning signal warning the driver of the need to take back control of the vehicle and running until the end of said first transition phase.

9. The method for controlling an automated driver-assistance system according to claim 5, wherein said first or second informative signal includes a visual component comprising the continuous display of an appropriate text message on at least one screen of said vehicle.

10. The method for controlling an automated driver-assistance system according to claim 4, wherein said first or second informative signal further includes a sound component consisting of emitting a single periodic sound signal.

* * * * *